United States Patent [19]

Goto et al.

[11] Patent Number: 4,729,696
[45] Date of Patent: Mar. 8, 1988

[54] CARTRIDGE FOR USE IN FIXING AN ANCHOR BOLT AND A METHOD

[75] Inventors: Koji Goto; Eiichi Suzuki, both of Nobeoka, Japan

[73] Assignee: Asahi Kasei Kogyo, Osaka, Japan

[21] Appl. No.: 634,426

[22] Filed: Jul. 26, 1984

[30] Foreign Application Priority Data

Jul. 27, 1983 [JP] Japan ............... 58-135772

[51] Int. Cl.⁴ .............................................. E21D 20/02
[52] U.S. Cl. .................................. 405/261; 206/219; 525/531
[58] Field of Search ............... 405/260, 261; 206/219, 206/220; 525/107, 121, 531

[56] References Cited

U.S. PATENT DOCUMENTS

| 3,324,663 | 10/1963 | McLean . | |
|---|---|---|---|
| 3,915,297 | 10/1975 | Rausch . | |
| 3,940,537 | 2/1976 | Burns | 525/531 X |
| 3,968,016 | 7/1976 | Wismer | 525/531 X |
| 4,105,114 | 8/1978 | Knox et al. | 405/261 |
| 4,236,849 | 12/1980 | Kennedy-Skipton | 405/261 |
| 4,343,921 | 8/1982 | Piestert | 525/531 X |
| 4,372,708 | 2/1983 | Bower et al. | 405/261 |
| 4,518,283 | 5/1985 | Gebauer et al. | 405/260 |

FOREIGN PATENT DOCUMENTS

| 3812863 | 6/1959 | Japan . |
|---|---|---|
| 4523381 | 9/1965 | Japan . |
| 54-128128 | 4/1978 | Japan . |
| 54-54422 | 7/1978 | Japan . |
| 579736 | 12/1978 | Japan . |
| 5921440 | 1/1979 | Japan . |
| 55-161197 | 6/1979 | Japan . |
| 1006587 | 7/1965 | United Kingdom . |

OTHER PUBLICATIONS

Soviet publication, "Inventions Illustrated", Sections P,Q: General/Mechanical, 1983.
Brochure issued by Show-Bond Construction Company Limited, Japan.
Brochure issued by Sanki Kogyo Co. Ltd., Japan and Nihon Deco Luxe Co. Ltd., Japan.

*Primary Examiner*—David H. Corbin
*Attorney, Agent, or Firm*—Birch, Stewart, Kolasch and Birch

[57] ABSTRACT

A cartridge for use in fixing an anchor bolt that encludes a fluidtight constructed casing having therein a first fluidtight chamber and a second fluidtight chamber separated from the first chamber, the first chamber containing a resin composed mainly of an ester of an epoxy resin with an organic acid comprising acrylic acid, methacrylic acid or a mixture thereof, the second chamber containing a curing agent for the resin. By the use of such a cartridge in fixing an anchor bolt to a base, there can be attained a quick fixation of the anchor bolt to the base, a high adhesive strength between the anchor bolt and the base, and a high chemical resistance of the cured resin, with little or no lowering of the adhesive strength for an prolonged period of time.

23 Claims, 6 Drawing Figures

CARTRIDGE FOR USE IN FIXING AN ANCHOR BOLT AND A METHOD

This invention relates to a cartridge for use in fixing an anchor bolt. More particularly, the present invention is concerned with a cartridge for use in fixing an anchor bolt comprising a fluidtight constructed casing, a fluidtight partitioning means disposed in the casing to form two chambers, a specific resin contained in one of the two chambers, and a curing agent for the resin contained in the other chamber. The casing and partitioning means are adapted to be broken by the action of the anchor bolt while driving the anchor bolt into a hole formed in a base for the anchor bolt to be fixed thereto and accommodating therein the cartridge, thereby causing the resin and the curing agent to be homogeneously mixed while driving the anchor bolt. By the use of such a cartridge in fixing an anchor bolt to a base, there can be attained a quick fixation of the anchor bolt to the base, a high adhesive strength between the anchor bolt and the base and a high chemical resistance of the cured resin, with little or no lowering of the adhesive strength for a prolonged period of time.

The term "anchor bolt" as used herein is intended to mean any bolts or deformed bars with projections or indentations, which are used to secure a machine, structure or part to concrete, masonry and the like or to reinforce or stabilize such structures as mine ceiling and overhanging rock strata.

The most commonly employed method of fixing an anchor bolt to a base, such as concrete, masonry or rock, is as follows. First a hole is drilled in a base. Then a resin and a curing agent for the resin are positioned in the hole. The resin and curing agent are contained in a glass or plastic cartridge having one chamber for the resin and a separate chamber for the curing agent. An anchor bolt is inserted into the hole using a rotary tool such as rotary hammer which is coupled to the rear end of the anchor bolt. In this step, the cartridge in the hole is broken by rotary percussion of the anchor bolt, causing the ingredients contained in the cartridge to be mixed. The mixing causes the curing agent to be distributed in the resin and, in turn, the resin starts to cure. When the resin is completely cured, the anchor bolt is firmly fixed to the base. As examples of the cartridge type adhesive conventionally employed in the above-mentioned method, there may be mentioned a combination of an unsaturated polyester resin and a curing agent, e.g., an organic peroxide such as benzoyl peroxide and a combination of an epoxy resin and a curing agent (see Japanese Patent Application Publication No. 38-12863/1963 and a brochure issued by Show-Bond Construction Company Limited, Japan). The above-mentioned two cartridge type adhesives both have serious drawbacks. The cartridge type adhesive comprising an unsaturated polyester resin and a curing agent is excellent in curing rate but poor in chemical resistance and water resistance. Specifically, where the base to which an anchor bolt is to be fixed is concrete, the cured unsaturaated polyester resin fixing the anchor bolt to the concrete is attacked by the alkaline components contained in the concrete, thereby causing the adhesive strength between the anchor bolt and the base to be lowered over time. Further, where an anchor bolt is used in environments where the cured adhesive located between the anchor bolt and the base is contacted with chemicals such as strong acids, strong alkalis and organic solvents or such that the cured adhesive is always exposed to a sea wind or seawater, the cured adhesive is eaten away, causing the adhesive strength between the anchor bolt and the base to be reduced.

On the other hand, the cartridge type adhesive comprising an epoxy resin and a curing agent therefor is excellent in chemical resistance and weather resistance but is poor in curing rate. In general, when this kind of adhesive is used for fixing an anchor bolt to a base two or more days are required to attain a sufficient adhesive strength between the anchor bolt and the base. This inevitably leads to the delay in performing subsequent works such as fixing of a machine, structure or part to the base. As is apparent from the foregoing, conventional cartridge type adhesives for use in fixing an anchor bolt to a base are not satisfactory.

Japanese Patent Application Laid-Open Specification No. 54-128128/1979 discloses a method of fixing an anchor bolt. In this method, an anchor bolt at its lower portion to be embedded in a base is covered with a resin foam such as urethane foam sponge. The resulting resin foam layer on the bolt is impregnated with a mixture of a cold-setting resin such as epoxy resin, epoxy acrylate resin, unsaturated polyester resin or isocyanate resin and a curing agent for the resin. In this connection, in Japanese Patent Application Laid-Open Specification No. 54-128128/1979, there is neither any description as to the kind of epoxy acrylate resin to be used nor any illustrative example of the use of an epoxy acrylate resin. After the impregnation, the anchor bolt is inserted into a hole pre-formed in a base for the anchor bolt to be fixed thereto. The resin impregnated into the resin form layer is cured and the anchor bolt is fixed to the base through the resin foam layer. The above-mentioned method disclosed in Japanese Patent Application Laid-Open Specification No. 54-128128/1979 is hereinafter often referred to as "impregnation method." The impregnation method is disadvantageous in the following points. The mixing of the resin with the curing agent for the resin should be carried out at the job site immediately before the anchor bolt covered with the resin form is impregnated with the resulting mixture. The reason for this is that upon mixing of the resin with the curing agent, the resin starts cure. For the same reason, after completion of the impregnation, the anchor bolt covered with the resin foam impregnated with the mixture of the resin with the curing agent should be inserted quickly in a hole formed in a base. Further, in this method, due to the poor mechanical strength of the resin foam, the adhesive strength between the anchor bolt and the base is inevitably low as compared with the adhesive strength attained by the use of the above-mentioned cartridge type adhesives.

As can be understood from the above, the impregnation method as disclosed in Japanese Patent Application Laid-Open Specification No. 54-128128/1979 is inferior because of the complicated procedures and poor adhesive strength between the anchor bolt and the base, to the methods in which the cartridge type adhesives are used and cannot advantageously be employed for practical purposes. Therefore, the methods in which cartridge type adhesives are used have been widely employed to fix an anchor bolt to a base. However, as mentioned before, conventional cartridge type adhesives have drawbacks, namely, poor chemical and water resistance in the case of the unsaturated polyester type, and necessity of a long curing time in the case of the epoxy resin type. That is, there is a technical dilemma.

Accordingly, it has been strongly desired in the art to develop an improved cartridge type adhesive for use in fixing an anchor bolt which is excellent in not only adhesive strength but also chemical and water resistance and curing rate. The present inventors have made extensive and intensive studies to develop such an improved cartridge type adhesive. As a result, the present inventors have unexpectedly found that a cartridge having one chamber containing a resin composed mainly of an ester of an epoxy resin with an organic acid comprising acrylic acid, methacrylic acid or a mixture thereof and a separate chamber containing a curing agent for the resin can eliminate the technical dilemma inevitably accompanying the above-mentioned conventional cartridge type adhesives and that, hence, by the use of such a cartridge not only an anchor bolt is firmly fixed to a base in a short time but also the adhesive strength between the anchor bolt and the base is not lowered for a prolonged period of time. The present invention has been made based on such a novel finding.

Therefore, it is an object of the present invention to provide a cartridge for use in fixing an anchor bolt which, when used in fixing an anchor bolt to a base, is capable of attaining a quick fixation of the anchor bolt to the base, a high adhesive strength between the anchor bolt and the base and high chemical and water resistance of the adhesive connection, with little or no lowering of the adhesive strength for a prolonged period of time.

It is another object of the present invention to provide a method of fixing an anchor bolt to a base by the use of a cartridge of the above kind, with great practical advantages.

The foregoing and other objects, features and advantages of the present invention will be apparent from the following detailed description taken in connection with the accompanying drawings in which.

Figure 5:
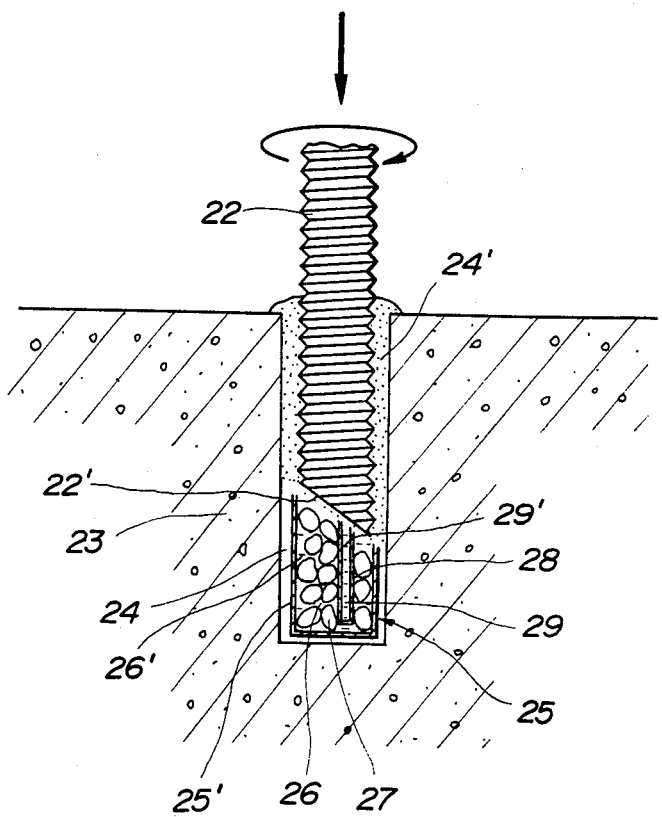
Figure 6:
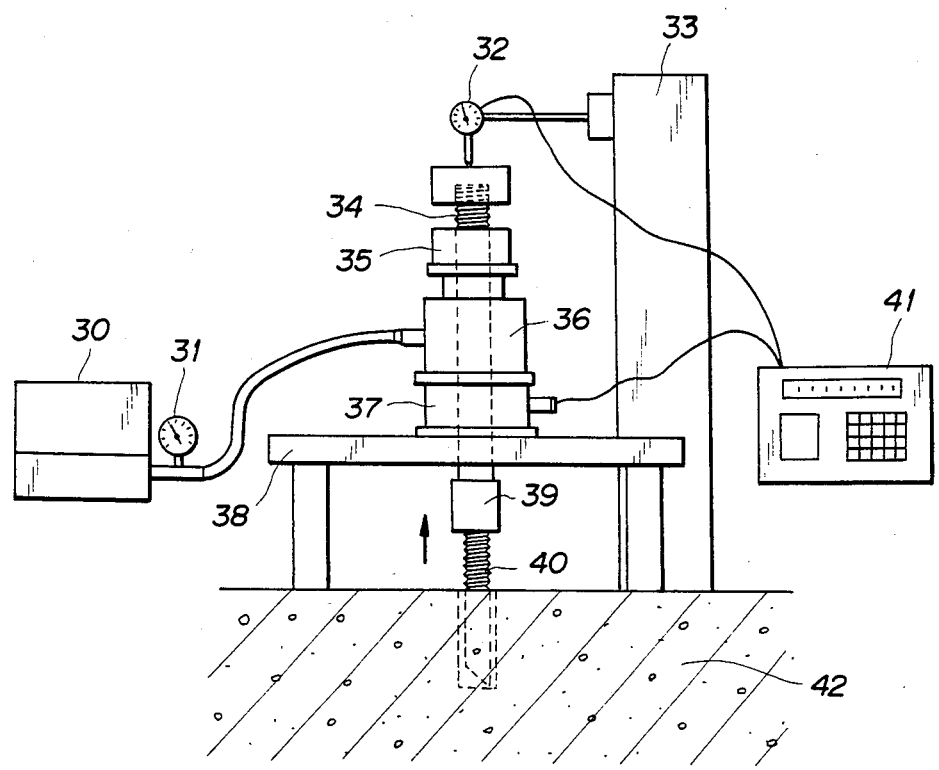

FIG. 5 is a schematic view illustrating how to perform fixation of an anchor bolt to a base by the use of a cartridge of the present invention, with portions and members except for the anchor bolt being shown in cross-section and with the interfering portion between the anchor bolt being inserted in a hole of the base and the cartridge being broken being diagrammatically shown for easy understanding; and FIG. 6 is a schematic vertical view of an apparatus used for measuring a tensile force required for pulling and causing a 1 mm axial displacement of the anchor bolt fixed to the base and a tensile force required for pulling the anchor bolt fixed to the base out of the base.

In one aspect of the present invention, there is provided a cartridge for use in fixing an anchor bolt comprising:

(a) a casing having a fluidtight construction;

(b) partitioning means disposed in said casing to form two chambers which are fluidtightly separated from each other;

(c) a resin contained in one of said two chambers, said resin being composed mainly of an ester of an epoxy resin with an organic acid comprising acrylic acid, methacrylic acid or a mixture thereof; and (d) a curing agent for said resin contained in the other chamber, said casing and said partitioning means being adapted to be broken by the action of the anchor bolt during the drive of the anchor bolt into a hole formed in a base for an anchor bolt to be fixed thereto and accommodating therein the cartridge, thereby causing said resin and said curing agent to be homogeneously mixed during the drive of the anchor bolt.

Figure 1:
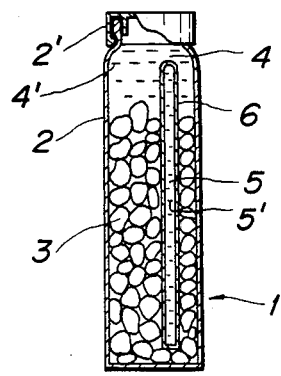
FIG. 1 is a cross-sectional view of one form of a cartridge of the present invention.

Referring now to FIG. 1, there is shown one form of a cartridge of the present invention. A glass-made bottle 2 has a neck which is engaged with a synthetic resin-made cap 2' to form a fluidtight constructed casing 1 (hereinafter often referred to as "external casing"). Within the external casing 1 disposed is another fluidtight constructed glassmade casing 6 (hereinafter often referred to as "internal casing"). Thus, there are formed two chambers, i.e. an external chamber 4 containing a resin 4' and an aggregate 3 and an internal chamber 5 containing a curing agent 5' for the resin 4'. In this embodiment, the chambers 4 and 5 contain the resin 4' and the curing agent 5', respectively, but they are interchangeable. The aggregate 3 may optionally be omitted.

Figure 2:
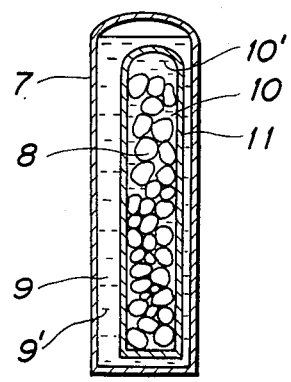
FIG. 2 is a cross-sectional view of another form of a cartridge of the present invention.

FIG. 2 shows an another form of a cartridge of the present invention. A fluidtight glass-made constructed internal casing 11 is disposed in a fluidtight glass-made constructed external casing 7. Thus, there are formed two chambers, i.e. an external chamber 9 containing a resin 9' and an internal chamber 10 containing a curing agent 10' for the resin 9' and an aggregate 8. In this embodiment, the chambers 9 and 10 contain the resin 9' and the curing agent 10', respectively, but they are interchangeable. The aggregate 8 may optionally be omitted.

Figure 3:
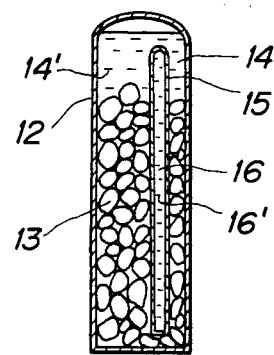
FIG. 3 is a cross-sectional view of still another form of a cartridge of the present invention.

FIG. 3 shows still further form of a cartridge of the present invention. A fluidtight glass-made constructed internal casing 15 is disposed in a fluidtight glass-made constructed external casing 12. Thus, there are formed two chambers, i.e. an external chamber 14 containing a resin 14' and an aggregate 13 and an internal chamber 16 containing a curing agent 16' for the resin 14'. In this embodiment, the chambers 14 and 16 contain the resin 14' and the curing agent 16', respectively, but they are interchangeable. The aggregate 13 may optionally be omitted.

Figure 4:
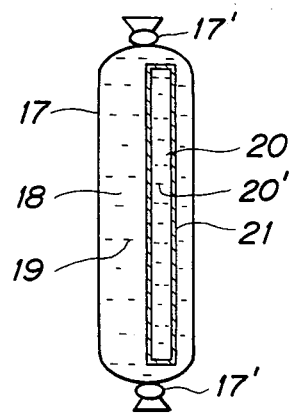
FIG. 4 is a cross-sectional view of a further form of a cartridge of the present invention.

FIG. 4 shows a further form of a cartridge of the present invention. A fluidtight glass made constructed internal casing 21 is disposed in a fluidtight synthetic resin film-made constructed external casing 17. The external casing 17 has a structure so that both ends of a hollow structure are closed by means of wire twists 17', 17'. Thus, there are formed two chambers, i.e. an external chamber 18 containing a resin 19 and a filler (not shown) and an internal chamber 20 containing a curing agent for the resin 19. In this embodiment, the chambers 18 and 20 contain the resin 19 and the curing agent 20', respectively, but they are interchangeable. The filler (not shown) may optionally be omitted.

The external casing and the partitioning means (the wall of the internal casing in the above-mentioned embodiments) of the cartridge of the present invention are made of such a material as will not be broken during the storage and in transit of the cartridge but will be broken into pieces by the action of an anchor bolt during the intrusion of the anchor bolt into a hole formed in a base for the anchor bolt to be fixed thereto and accommodating therein the cartridge. As examples of the material of the external and internal casings, there may be mentioned glass, ceramics, synthetic resins or synthetic resin films.

In the cartridge of the present invention, the resin contained in one of the two chambers formed by the partitioning means is of crucial importance. It is required that the resin be composed mainly of an ester of an epoxy resin with an organic acid comprising acrylic acid, methacrylic acid or a mixture thereof. The above-mentioned esters are hereinafter often referred to simply as "epoxy acrylte resin." As is well known, an epoxy acrylate resin is usually produced in the form of a mixture of various compounds rather than a single compound. It is difficult to separate and identify individual compounds constituting the mixture. Therefore, in general, as in various polymers which are usually obtained in the form a mixture of a plurality of polymers which differ in the degree of polymerization, the epoxy acrylate resin is regarded as a single compound having a structure presumed stoichiometrically from the kinds of the raw materials and the charged amounts thereof. (See for example, Japanese Patent Application Laid-Open Specification Nos. 49-110780 and 49-128088 and Japanese Patent Application Publication No. 55-44766.) The epoxy acrylate resins employed in the present invention should also be considered to be those as mentioned above.

The organic acid component of the epoxy acrylate may contain a small amount of unsaturated carboxylic acid as far as the incorporation does not adversely affect the present invention. As examples of the unsaturated carboxylic acid, there may be mentioned unsaturated monocarboxylic acids such as itaconic acid and unsaturated dicarboxylic acids such as maleic acid and fumaric acid.

The epoxy resin component of the epoxy acrylate resin is preferably at least one polyfunctional epoxy resin selected from the group consisting of bisphenol type epoxy resins such as bisphenol A type epoxy resin and bisphenol F type epoxy resin, polyphenol type epoxy resins such as novolak type epoxy resin, halogenated bisphenol type epoxy resins such as tetrabromobisphenol A glycidyl ether, polyglycidyl ester type epoxy resins such as diglycidyl phthalate, polyglycidyl ether type epoxy resins such as a glycidyl ether of an aliphatic polyalcohol, and peracetic acid oxidation type epoxy resins such as 3,4-epoxy-6-methylcyclohexylmethyl 3,4-epoxy-6'-methylcyclohexanecarboxylate. Of the above mentioned epoxy resins bisphenol A type and bisphenol F type epoxy resins are preferable. In this connection, it is preferred that the epoxy resin component of the epoxy acrylate resin have an epoxy equivalent of about 150 to about 500 (molecular weight: about 300 to about 1,000).

As mentioned above, the resin is composed mainly of an epoxy acrylate resin. The resin may contain a reactive monomer, a cure accelerator, a polymerization inhibitor and the like. As examples of the reactive monomer, there may be mentioned aromatic vinyl monomers, aliphatic vinyl monomers, allyl esters and the like. Of the above-mentioned reactive monomers, preferred is at least one member selected from the group consisting of styrene, a vinyltoluene, a chlorostyrene, methyl methacrylate, butyl acrylate, and diallyl phthalate. Styrene is particularly preferred. The reactive monomer is generally employed in an amount of 30 to 60% by weight based on the total amount of the epoxy acrylate resin and the reactive monomer. In this connection, it is preferred that the viscosity of the mixture of the epoxy acrylate with the reactive monomer be 5,000 poises or less, more preferably 1 to 50 poises, particularly preferably 1 to 10 poises at 25° C. as measured using a rotational viscometer according to Japanese Industrial Standard (JIS) K69011977. When the resin does not contain the reactive monomer, the viscosity of the epoxy acrylate resin is also preferably 5,000 poises or less, more preferably 1 to 50 poises, particularly preferably 1 to 10 poises at 25° C. as measured using a rotational viscometer according to JIS K6901-1977.

As examples of the cure accelerator, there may be mentioned amines such as dimethylaniline, diethylaniline and dimethyl-p-toluidine, metallic soaps such as cobalt naphthenate, cobalt octoate, manganese naphthenate and calcium naphthenate, chelate compounds such as vanadylacetyl acetonate, ironacetyl acetonate, and the like.

As examples of the polymerization inhibitor, there may be mentioned hydroquinone, tert-butyl catechol, hydroquinone monoethyl ester, 2,5-di-tert-butyl hydroquinone, and the like.

In the cartridge of the present invention, the fluid-tight chamber separated from the chamber containing the resin contains a curing agent. As the curing agent, preferred is an organic peroxide. As examples of such an organic peroxide, there may be mentioned at least one member selected from the group consisting of benzoyl peroxide, methyl ethyl ketone peroxide, lauroyl peroxide, dicumyl peroxide, tertbutyl peroctoate, cumene hydroperoxide, and cyclohexanone peroxide. Of the above-mentioned peroxides, particularly preferred is at least one member selected from the group consisting of benzoyl peroxide and methyl ethyl ketone peroxide.

The cartridge of the present invention may contain an aggregate and a filler according to need. The aggregate and the filler may be contained in either of the chambers containing the resin component and the chamber containing the curing agent. The kinds of the aggregate and the filler are not critical. However, debris of natural stone and artificial stone such as magnesia clinker and the like are generally employed as the aggregate and calcium carbonate, calcium sulfate, silicic anhydride, clay and the like are generally employed as the filler. The particle sizes of the aggregate and the filler may vary depending on the size of the chamber into which they are charged, but are generally 0.5 to 2.5 mm for the aggregate and 100 to 200 mesh (Tyler) for the filler.

The cartridge of the present invention may be prepared by the known techniques (see, for example, Japanese Patent Application Publication No. 38-12863/1963). For example, a resin and, if desired, additives such as reactive monomer, cure accelerator, polymerization inhibitor, aggregate and filler are charged in one of the two chambers pre-formed in a casing by molding or the like. A curing agent and, if desired, an aggregate and a filler are charged in the other chamber of the casing. Subsequently, the casing is sealed by an appropriate method chosen according to the material of the casing. For example, when the casing is made of glass, the casing is generally sealed by melting or by means of a silicone resin or a cap made of a synthetic resin such as polyethylene, polypropylene and polyamide. When the casing is made of a synthetic resin, the casing may be sealed by means of a silicone resin or a cap of the kind as mentioned above. When the casing is made of a synthetic resin film, the casing may be sealed by means of wire twists. Alternatively, the cartridge of the present invention may be prepared as follows. Into a casing (internal casing made of glass) are charged a curing agent and, if desired, an aggregate and a filler. The casing is sealed by melting or by means of a silicone resin or a cap. The sealed casing is put into another casing (external casing made of glass) having a large size than the internal casing. Into the external casing are charged a resin and, if desired, a reactive monomer, a cure accelerator, a polymerization inhibitor, an aggregate and a filler. The external casing is sealed by melting or by means of a silicone resin or a cap. Of course, according to the kind of material of the casing, the sealing method may be appropriately changed.

The proportion of each of the ingredients contained in the cartridge of the present invention may vary depending on applications for the cartridge. But, the amounts of the epoxy acrylate resin and the reactive monomer are generally 40 to 100 parts by weight and 0 to 60 parts by weight, respectively, and are preferably 40 to 95 parts by weight and 5 to 60 parts by weight, respectively, provided that the total amount of the epoxy acrylate resin and the reactive monomer is 100 parts by weight. The amounts of the cure accelerator, the polymerization inhibitor, the aggregate, the filler and the curing agent are generally 0 to 5 parts by weight, 0 to 0.2 parts by weight, 0 to 500 parts by weight, 0 to 500 parts by weight and 1 to 10 parts by weight, respectively, based on 100 parts by weight of the epoxy acrylate resin where the resin contains no reactive monomer or based on 100 parts by weight of a mixture of the epoxy acrylate resin and the reactive monomer where the resin component contains the reactive monomer.

In another aspect of the present invention, there is provided a method of fixing an anchor bolt which comprises:
(1) drilling a hole in a base;
(2) inserting a cartridge into the hole, said cartridge comprising:
   (a) a casing having a fluidtight construction;
   (b) partitioning means disposed in said casing to form two chambers which are fluidtightly separated from each other;
   (c) a resin contained in one of said two chambers, said resin being composed mainly of an ester of an epoxy resin with an organic acid comprising acrylic acid, methacrylic acid or a mixture thereof; and
   (d) a curing agent for said resin contained in the other chamber; and
(3) driving into the hole an anchor bolt, thereby causing said casing and said partitioning means of said cartridge to be broken by the action of the anchor bolt and said resin and said curing agent to be homogeneously mixed and filled in a spacing between the inner wall of the hole and the periphery of the bolt, thus enabling the anchor bolt to be fixed to the base in a short period of time, with a strong adhesive connection between the anchor bolt and the base, said strong adhesive connection having a high resistance to chemicals and water.

The method of the present invention will now be explained with reference to FIG. 5. FIG. 5 illustrates the essential feature of the method of the present invention. A hole 24 is drilled in a base 23. The diameter of the hole 24 is generally about 2 to 12 mm larger than the outer diameter of an anchor bolt 22 to be fixed to the base 23. The depth of the hole 24 may widely be varied depending on the intended adhesive strength between the anchor bolt 22 and the base 23. Of course, the deeper the hole, the higher the adhesive strength between the anchor bolt and the base. However, in general, it is sufficient if the depth of the hole 24 is about 6 to 14 times the outer diameter of the anchor bolt 22 to be fixed to the base 23. The cartridge 25 of the present invention is inserted into the hole 24. The width of the cartridge of the present invention is generally about 0.5 to 5 mm larger than the outer diameter of the anchor bolt 22. When an external casing 25' and an internal casing 28 of the cartridge 25 of the present invention is made of a synthetic resin film, it is preferred that the width of the cartridge 25 of the present invention be about 1 to 5 mm larger than the outer diameter of the anchor bolt 22. The length of the cartridge 25 of the present invention may be varied depending upon the depth of the hole 24. But, in general, the ratio of the length of the cartridge 25 to the depth of the hole 24 is generally about 0.7 to 1.0. In the method of the present invention, a plurality of cartridges of the present invention may be inserted, in alignment, into the hole 24. In this case, it is preferred that the ratio of the total length of the cartridges to the depth of the hole 22 be about 0.7 to 1.0. After insertion of the cartridge, the anchor bolt 22 is driven into the hole 24 in which the cartridge 25 is accommodated. It is preferred that the driving of the anchor bolt 22 in the hole 24 be performed by a method in which a rotary tool such as rotary hammer is first coupled to rear end of the anchor bolt 22 and then rotated in a direction indicated by arrow to drive the anchor bolt 22 into the hole 24. During the drive of the anchor bolt 22 into the hole 24 in a direction indicated by arrow, the cartridge 25 in the hole 24 is broken by rotary percussion of the anchor bolt 22, causing the ingredients contained in the cartridge to be mixed. Illustratively stated, the external casing 25 and the internal casing 28 are broken and, at the same time, the aggregate 27 (which may be omitted) is finely divided. The debris formed from the external casing 25 and the internal casing 28 also serve as an aggregate effectively. They are homogeneously mixed with the resin 26' from the external chamber 26 and the curing agent 29' from the internal chamber 29 to form a mixture 24'. Then, the mixture starts to cure. When the mixture 24' is completely cured, the anchor bolt is firmly fixed to the base 23. Incidentally, it is preferred that the anchor bolt 22 to be fixed to the base have its forward end 22' cut diagonally with respect to the axis of the anchor bolt 22. By using an anchor bolt having such an end shape, the ingredients contained in the cartridge can be homogeneously mixed with each other to a great extent. As a result, high adhesive strength between the anchor bolt and the base can be attained. In this connection, it is particularly preferred that the cutting angle be 45° with respect to the axis of the anchor bolt.

The epoxy acrylate resin to be contained in the cartridge of the present invention may be produced according to customary methods. For example, an epoxy resin having at least one epoxy group is reacted with acrylic acid or methacrylic acid to prepare an epoxy acrylate resin. The acrylic acid or methacrylic acid is employed in an amount of about one mole per epoxy group contained in the epoxy resin. With respect to further specific reaction conditions, reference may be made to, for example, Japanese Patent Application Laid-Open Specification Nos. 49-128088, 49-28692 and 48-66182 and Japanese Patent Application Publication Nos. 49-12091 and 55-44766.

As described in the foregoing, the cartridge of the present invention has the following advantages:

(1) The cartridge of the present invention can eliminate all the drawbacks of the conventional cartridge type adhesives.

One of the conventional cartridge type adhesives, as mentioned before, comprises an unsaturated polyester resin and a curing agent for the resin. This conventional cartridge type adhesive is excellent in curing rate but poor in water resistance and chemical resistance, particularly alkali resistance. Therefore, when an anchor bolt is fixed to concrete using this type adhesive, the cured resin between the anchor bolt and the base is attacked by the alkali components contained in concrete and, hence, the adhesive strength between the anchor bolt and the concrete is lowered with the passage of time.

As mentioned before, there is also known another conventional cartridge type adhesive comprising an epoxy resin and a curing agent for the epoxy resin. This conventional cartridge type adhesive is excellent in water resistance and chemical resistance but extremely poor in curing rate. When an anchor bolt is fixed to a base using the above cartridge type adhesive, two or more days are required to attain a sufficient adhesive strength between the anchor bolt and the base.

As is apparent from the base, the former is excellent in curing rate but poor in water resistance and chemical resistance, whereas the latter is excellent in water resistance and chemical resistance but extremely poor in curing rate. In other words, as mentioned before, there is a typical technical dilemma in the art.

By contrast, according to the present invention, there is provided a completely new cartridge type adhesive which is extremely excellent not only in curing rate but also in water resistance and chemical resistance. As is apparent from examples and comparative example which will be given later, unlike the first-mentioned conventional cartridge type adhesive comprising the unsaturated polyester resin and the curing agent for the resin, when an anchor bolt is fixed to a base using the cartridge of the present invention, the adhesive strength between the anchor bolt and the concrete is not lowered for a prolonged period of time even under corrosive environment, for example, even when the base is concrete and, therefore, the adhesive connection is always exposed to alkaline atmosphere, or even when the base is located near the sea and, therefore, is always exposed to corrosive atmosphere. Further, when an anchor bolt is fixed to a base using the cartridge of the present invention, a sufficient adhesive strength between the anchor bolt and the base can be attained in two or three hours after insertion of the anchor bolt into a hole for the anchor bolt to be fixed thereto, as is apparent from Example 1 which will be given later. Thus, the technical delemma inevitably accompanying the conventional cartridge type adhesives has successfully been solved. By the use of the cartridge of the present invention, the anchor bolt can be fixed to the base in a short period of time, with a strong adhesive connection between the anchor bolt and the base. The adhesive connection has also high resistance to chemicals and water.

(2) The cartridge of the present invention contains an epoxy acrylate resin in one of the two chambers and a curing agent for the epoxy acrylate resin in the other chamber. Therefore, when an anchor bolt is fixed to a base using the cartridge of the present invention, there is no need for complicated procedures at the job site as opposed to the impregration method as disclosed in Japanese Patent Application Laid-Open Specification No. 54-128128/1979 which requires at the job site mixing a resin component with a curing agent for the resin component and subsequent impregnation of a resin foam covering an anchor bolt with the resulting mixture. Further, in the impregnation method, the adhesive strength between the anchor bolt and the base is poor because of poor mechanical strength of the resin foam. On the other hand, when an anchor bolt is fixed to a base using the the cartridge of the present invention, not only a high adhesive strength between the anchor bolt and the base can be attained but also the high adhesive strength between the anchor bolt and the base is not lowered for a prolonged period of time even under corrosive environment.

The following examples illustrate the present invention in more detail but should not be construed as limiting the scope of the invention.

In the following examples, the adhesive strength between an anchor bolt and a base was evaluated in terms of a tensile force required to cause 1 mm axial displacement of the anchor bolt fixed to the base as well as tensile force required to pull the anchor bolt fixed to the base out of the base. The method of measuring the tensile force will be explained below with reference to FIG. 6.

An anchor bolt 40 fixed to a base 42 is connected to a pulling threaded rod 34 by means of a coupling means 39. A nut 35 is journalled on the pulling threaded rod 34 and connected to a hydraulic ram 36. An axial tensile force is applied to the anchor bolt 40, in a direction indicated by arrow, through a loading frame 38 by means of a hydraulic pump 30 equipped with a hydraulic gauge 31 and the hydraulic ram 36. The axial displacement of the anchor bolt 40 and the load applied to the anchor bolt 40 are measured by a dial gauge 32 carried by a support 33 and a load cell 37, respectively, which are each connected to a digital indication device 41. In this connection, the tensile force applied to the anchor bolt 40 is increased by substantially equal increments. The application of the tensile force is continued until the anchor bolt 40 is caused to be displaced and finally to be pulled out of the base 42. The tensile force applied and the axial displacement of the anchor bolt 40 are recorded in the digital indication device 41. The relationship between the tensile force applied to the anchor bolt 40 and the displacement of the anchor bolt 40 is graphed. From the graph, the tensile force value corresponding to 1 mm displacement of the anchor bolt 40 (the tensile force required to cause 1 mm axial displacement of the anchor bolt 40) and the tensile force value corresponding to the maximum point on the graph (the tensile force required to pull the anchor bolt 40 out of the base 42) are determined.

The viscosity of a mixture of an epoxy acrylate resin and a reactive monomer is determined at 25° C. using a rotational viscometer according to JIS K6901-1977.

The acid value of an epoxy acrylate resin used was determined according to JIS K6901-1977.

The molecular weight of an epoxy resin used is given in terms of a viscosity-average molecular weight and the viscosity is determined according to a method prescribed in ASTM D1601-78.

EXAMPLE 1

Cartridges for use in fixing an anchor bolt were each prepared by the following method.

0.47 g of benzoyl peroxide as the curing agent which had been diluted with calcium sulfate to have a concentration of 50% by weight was charged in a glass-made internal casing having an outer diameter of 5 mm and a length of 70 mm, and the casing was sealed by means of a silicone resin. The sealed internal casing was then inserted in a glass-made external casing having an outer diameter of 13 mm and a length of 85 mm. 6.9 g of a magnesia clinker (grain diameter, 1.0 to 3.3 mm), a mixture (viscosity at 25° C., 1.5 poises) of 2.7 g of a bisphenol A type epoxy acrylate resin prepared from a bisphenol A type epoxy resin (molecular weight, about 600-700) and acrylic acid in an amount of one mole per epoxy group contained in the bisphenol A type epoxy resin and 1.6 g of styrene were charged in the external casing together with 0.04 g of dimethylaniline as the curing accelerator, and the external casing was sealed by means of a nylon-made cap. Thus, a cartridge was obtained.

A concrete block having a compression strength of 250 kg/cm$^2$ was subjected to boring to obtain holes (diameter, 14.5 mm; depth, 100 mm) of the number corresponding to the number of the cartridges as prepared above. The cartridges were then separately inserted into these holes. Subsequently, into each of these holes, an anchor bolt having an outer diameter of 12 mm and a length of 150 mm was driven to the bottom of the hole by means of a rotary hammer which was coupled to the rear end of the bolt. In this step, the cartidges which had already been inserted into the holes were broken by the rotary percussion of the anchor bolt, and the ingredients contained in the cartridges were homogeneously mixed.

After a curing period as indicated in Table 1, the anchor bolts fixed to the concrete block were subjected to measurement of the tensile force.

The results obtained are shown in Table 1.

On the other hand, in order to examine the alkali resistance of the adhesive connection between the bolt and the concrete, three anchor bolts (outer diameter, 12 mm; length, 150 mm) were fixed to a concrete block having a compression strength of 250 kg/cm$^2$ in substantially the same manner as described above. The concrete blocks to which the anchor bolts had been fixed were immersed in an aqueous solution saturated with calcium hydroxide. 45 days after immersion, the anchor bolts were subjected to measurement of the tensile force.

The results obtained are shown in Table 1.

In the meantime, the anchor bolts used in this Example were each prepared by the following method:

An S 45 C rod (according to the Japanese Industrial Standard G 4051) was, at its one end, cut diagonally with respect to the axis of the rod at a cutting angle of 45°. The rod was then subjected to threading so that a thread is formed throughout the axial length of therod. The thus thread rod was subject to hardening. Thus, a bolt was formed.

TABLE 1

| | Condition | | | | | | | | |
|---|---|---|---|---|---|---|---|---|---|
| | Cured at 35° C. | | | | | | | Immersed in an aqueous solution saturated with calcium hydroxide | |
| | Tensile force required for pulling the anchor bolt out of the base (ton) | | | | | | Tensile force required to cause 1 mm-axial displacement (ton) | Tensile force required for pulling the anchor bolt out of the base (ton) | Tensile force required to cause 1 mm-axial displacement (ton) |
| | Curing period | | | | | | | | |
| Example No. | 1 hr | 2 hrs | 3 hrs | 1 day | 3 days | 45 days | 3 days  45 days | 45 days | |
| Example 1 | 6.4 | 6.9 | 7.0 | 7.0 | 7.1 | 7.1 | 5.0  5.1 | 7.2 | 5.1 |

(Note)
Each of the tensile force values indicated above is the average value of the values obtained with respect to three anchor bolts.

EXAMPLE 2

Cartridges were prepared in substantially the same manner as in Example 1, except that 0.45 g of methyl ethyl ketone peroxide and 0.02 g of cobalt naphthenate were employed as the curing agent and the curing accelerator, respectively. Using the so-prepared cartridges, the same kind of bolts as employed in Example 1 were fixed to a concrete block having a compression strength of 250 kg/cm$^2$ in the same manner as in Example 1. The resulting adhesive connection between the anchor bolt and the concrete block was cured at 25° C.

After a curing period as indicated in Table 2, three bolts were subjected to measurement of the tensile force. Further, the alkali resistance of the adhesive connection was examined in the same manner as in Example 1.

The results obtained are shown in Table 2.

Comparative Example

Cartridges were prepared in substantially the same manner as in Example 1, except that 4.3 g of POLYMAR [trade name of styrene-modified unsaturated polyester resin (unsaturated resin content, 3.2 g; styrene content, 1.1 g; molar ratio of phthalic acid component, maleic acid component and propylene glycol component, 1:1:2) manufactured and sold by Takeda Chemical Industries, Ltd.] and 0.02 g of dimethylaniline were used in place of 4.3 g of the resin mixture and 0.04 g of dimethylaniline used in Example 1, respectively. Using the so-prepared cartridges, the same kind of bolts as employed in Example 1 were fixed to a concrete block having a compression strength of 250 kg/cm$^2$ in the same manner as in Example 1. The resulting adhesive connection between the anchor bolt and the concrete block was cured at 25° C.

After a curing period as indicated in Table 2, three bolts were subjected to measurement of the tensile force. Further, the alkali resistance of the adhesive connection was examined in the same manner as in Example 1.

The results obtained are shown in Table 2.

TABLE 2

| | Condition | | | | | |
|---|---|---|---|---|---|---|
| | Cured at 25° C. | | | | Immersed in an aqueous solution saturated with calcium hydroxide | |
| | Curing period | | | | | |
| | 3 days | | 45 days | | 45 days | |
| Example No. | Tensile force required to cause 1 mm-axial displacement (ton) | Tensile force required for pulling the anchor bolt out of the base (ton) | Tensile force required to cause 1 mm-axial displacement (ton) | Tensile force required for pulling the anchor bolt out of the base (ton) | Tensile force required to cause 1 mm-axial displacement (ton) | Tensile force required for pulling the anchor bolt out of the base (ton) |
| Example 2 | 4.9 | 6.8 | 4.8 | 6.7 | 4.7 | 6.7 |
| Comparative Example | 4.5 | 6.7 | 3.8 | 5.5 | 3.3 | 4.4 |

(Note)
Each of the tensile force values indicated above is the average value of the values obtained with respect to three anchor bolts.

EXAMPLE 3

A mixture of 390 g of an epoxy resin AER-331 [the trade name of a bisphenol A type epoxy resin (epoxy equivalent, 189) manufactured and sold by Asahi Kasei Kogyo K.K., Japan], 172 g of methacrylic acid, 0.1 g of benzoquinone, and 2 g of diethylamine hydrochloride was heated at 125° C. and maintained, while stirring, at the temperature to obtain a bisphenol A type epoxy acrylate resin having an acid value of 4.5. To the thus obtained bisphenol A type epoxy acrylate resin was added 562 g of styrene to obtain a mixture.

Cartridges were prepared in substantially the same manner as in Example 1, except that the above-prepared mixture of the bisphenol A type epoxy acrylate resin and styrene was employed in place of the resin mixture used in Example 1. Using the so-prepared cartridges, the same kind of anchor bolts as employed in Example 1 were fixed to the concrete block of the same kind as employed in Example 1 in the same manner as in Example 1, and the resulting adhesive connection between the anchor bolt and the concrete block was cured at 25° C. After the same curing period as in Example 2, the tensile force test with respect to the anchor bolts fixed to the concrete block and the alkali resistance test with respect to the adhesive connection were effected in the same manner as in Example 2.

The results obtained with respect to the tensile force of the anchor bolts fixed to the concrete block and the alkali resistance of the adhesive connection were substantially the same as those obtained in Example 2.

EXAMPLE 4

In the same manner as in Example 3, the same kind of epoxy acrylate resin as in Example 3 was prepared. To 562 g of the thus prepared epoxy acrylate resin were added reactive monomers, i.e., 50 g of butyl acrylate, 150 g of methyl methacrylate and 100 g of styrenes to obtain a mixture.

Cartridges were prepared in substantially the same manner as in example 1, except that the above-obtained mixture of the epoxy acrylate resin and reactive monomers was employed in place of the resin mixture used in Example 1. Using the so-prepared cartridges, the same kind of the anchor bolts as employed in Example 1 were fixed to the concrete block of the same kind as employed in Example 1 in the same manner as in Example 1, and the resulting adhesive connection between the anchor bolts and the concrete block was cured at 25° C. After the same curing period as in Example 2, the tensile force test with respect to the anchor bolts fixed to the corcrete block and the alkali resistance test with respect to the adhesive connection were effected in the same manner as in Example 2.

The results obtained with respect to the tensile force of the anchor bolts fixed to the concrete block and the alkali resistance of the adhesive connection were substantially the same as those obtained in Example 2.

EXAMPLE 5

A mixture of 400 g of diglycidyl phthalate, 180 g of methacrylic acid, 0.1 g of hydroquinone, and 1.0 g of diethyl amine hydrochloride was heated to 125° C. and maintained, while stirring, at the temperature to obtain an epoxy acrylate resin having an acid value of 4.5. To the thus obtained epoxy acrylate resin was added 562 g of styrene to obtain a mixture.

Cartridges were prepared in substantially the same manner as in Example 1, except that the above-obtained mixture of the epoxy resin and styrene was employed in place of the resin mixture used in Example 1. Using the so-prepared cartridges, the same kind of anchor bolts as employed in Example 1 were fixed to the concrete block of the same kind as employed in Example 1 in the same manner as in Example 1, and the resulting adhesive connection between the anchor bolt and the concrete block was cured at 25° C. After the same curing period as in Example 2, the tensile force test with respect to the ancor bolts fixed to the concrete block and the alkali resistance test with respect to the adhesive connection were effected in the same manner as in Example 2.

The results obtained with respect to the tensile force of the anchor bolts fixed to the concrete block and the alkali resistance of the adhesive connection were substantially the same as those obtained in Example 2.

EXAMPLE 6

A mixture of 390 g of an epoxy resin AER-331, 86 g of acrylic acid, 73 g of adipic acid, 0.87 g of benzoquinone and 2 g of diethylamine hydrochloride was heated to 125° C. and maintained, while stirring, at the temperature to obtain an epoxy acrylate resin having an acid value of 3.1. To the thus obtained epoxy acrylate resin was added 562 g of styrene to obtain a mixture.

Cartridges were prepared in substantially the same manner as in Example 1, except that the above-obtained mixture of epoxy acrylate resin and styrene was employed in place of the resin mixture used in Example 1. Using the so-prepared cartridges, the same kind of anchor bolts as employed in Example 1 were fixed to the concrete block of the same kind as employed in Example 1 in the same manner as in Example 1, and the resulting adhesive connection between the anchor bolt and the concrete block was cured at 25° C. After the same curing period as in Example 2, the tensile force test with respect to the anchor bolts fixed to the concrete block and the alkali resistance test with respect to the adhesive connection were effected in the same manner as in Example 2.

The results obtained with respect to the tensile force of the anchor bolts fixed to the concrete block and the alkali resistance of the adhesive connection were substantially the same as those obtained in Example 2.

EXAMPLES 7 TO 10

Various epoxy acrylate resins were separately prepared in substantially the same manner as in Example 3, except that the epoxy resins as indicated in Table 3 were used in amounts as indicated in Table 3 instead of 390 g of the epoxy resin AER-331.

TABLE 3

| Example No. | Epoxy resin used Kind | Amount (g) | Acid value of epoxy acrylate obtained |
|---|---|---|---|
| 7 | Neopentyl glycol diglycidyl ether | 120 | 2.5 |
| 8 | Novolak type epoxy resin DEN-438 *1 | 190 | 5.0 |
| 9 | Alicyclic epoxy resin Chisso Nox #221 *2 | 300 | 5.5 |
| 10 | Bisphenol A type epoxy resin AER-661 *3 (epoxy equivalent: 470) | 950 | 2.3 |

Note:
*1 the trade name of a novolak type epoxy resin manufactured and sold by Dow Chemical Co.
*2 the trade name of an alicyclic epoxy resin manufactured by Union Carbide Corp. and sold by Chisso Corp.
*3 the trade name of a bisphenol A type epoxy resin manufactured and sold by Asahi Kasei Kogyo K.K.

To each of the epoxy acrylate resins as prepared above was added 562 g of styrene to obtain a mixture.

Cartridges containing the above-obtained mixtures of the epoxy acrylate resins and styrene were separately prepared in substantially the same manner as in Example 1, except that the above-obtained mixtures of the epoxy resins and styrene were used in place of the resin mixture used in Example 1.

Using the so-prepared cartridges, the same kind of anchor bolts as employed in Example 1 were fixed to the concrete block of the same kind as employed in Example 1, and the resulting adhesive connections between the anchor bolts and the concrete block were cured at 25° C. After the same curing period as in Example 2, the tensile force test with respect to the anchor bolts fixed to the concrete block and the alkali resistance test with respect to the adhesive connections between the anchor bolts and the concrete block were effected in the same manner as in Example 2.

The results obtained with respect to the tensile force of the anchor bolts fixed to the concrete block and the alkali resistance of the adhesive connections between the anchor bolts and the concrete block were substantially the same as those obtained in Example 2.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cartridge for use in fixing an anchor bolt, comprising:
    (a) a casing having a fluidtight construction;
    (b) partitioning means disposed in said casing for forming a first and a second chamber which are fluidtight relative to each other;
    (c) a resin contained in said first chamber, said resin being substantially composed of an ester of an epoxy resin with an organic acid selected from the group consisting of acrylic acid, methacrylic acid and a mixture thereof and a reactive monomer; and
    (d) a curing agent for said resin component contained in said second chamber, said curing agent comprising an organic peroxide,
    said casing and said partitioning means being breakable by the action of the anchor bolt so that said resin and said curing agent are homogeneously mixed when the anchor bolt is driven into said cartridge.

2. The cartridge according to claim 1, wherein said resin has a viscosity of 5,000 poises or less at 25° C. as measured using a rotational viscometer according to JIS K6901-1977.

3. The cartridge according to claim 2, wherein said reactive monomer has at least one member selected from the group consisting of styrene, a vinyltoluene, a chlorostyrene, butyl acrylate, methyl methacrylate and diallyl phthalate.

4. The cartridge according to claim 1, wherein said epoxy resin has at least one polyfunctional epoxy resin selected from the group consisting of bisphenol type, polyphenol type, halogenated bisphenol type, polyglycidyl ester type, polyglycidyl ether type, and peracetic acid oxidation type epoxy resins.

5. The cartridge according to claim 1, wherein said epoxy resin has at least one polyfunctional epoxy resin selected from the group consisting of bisphenol A type and bisphenol F type epoxy resins.

6. The cartridge according to claim 4, wherein said epoxy resin has at least one polyfunctional epoxy resin selected from the group consisting of bisphenol A type and bisphenol F type epoxy resins.

7. The cartridge according to claim 1, wherein said curing agent has at least one member selected from the group consisting of benzoyl peroxide, methyl ethyl ketone peroxide, lauroyl peroxide, dicumyl peroxide, tert-butyl peroctoate, cumene hydroperoxide, and cyclohexanone peroxide.

8. The cartridge according to claim 1, wherein said curing agent has at least one member selected from the group consisting of benzoyl peroxide and methyl ethyl ketone peroxide.

9. The cartridge according to claim 7, wherein said curing agent has at least one member selected from the group consisting of benzoyl peroxide and methyl ethyl ketone peroxide.

10. The cartridge according to claim 1, wherein the epoxy resin component has an epoxy equivalent of about 150 to about 500 and a molecular weight of about 300 to about 1,000.

11. The cartridge according to claim 1, wherein the reactive monomer is employed in an amount of 30 to 60% by weight based on the total amount of epoxy acrylate resin and the reactive monomer.

12. The cartridge according to claim 1, further comprising a cure accelerator selected from the group consisting of amines, metallic soaps and chelate compounds.

13. The cartridge according to claim 1, further comprising an aggregate and a filler.

14. The cartridge according to claim 1, wherein the amount of the epoxy acrylate and the reactive monomer are 40 to 100 parts by weight and 0 to 60 parts by weight, respectively.

15. The cartridge according to claim 1, which comprises 0 to 5 parts by weight of a cure accelerator, 0 to 0.2 parts by weight of a polymerization inhibitor, 0 to 500 parts by weight of an aggregate, 0 to 500 parts by weight of a filler and 1 to 10 parts by weight of the curing agent based on the weight of the epoxy acrylate resin and reactive monomer.

16. The cartridge according to claim 1, wherein the partitioning means is an enclosed capsule disposed within said fluidtight casing.

17. The cartridge according to claim 16, wherein the curing agent is disposed within the enclosed capsule and an aggregate and filler is disposed between the enclosed capsule and the fluidtight casing.

18. The cartridge according to claim 16, wherein an aggregate and filler is disposed within the enclosed capsule and the curing agent is disposed between the enclosed capsule and the fluidtight casing.

19. A method of fixing an anchor bolt, comprising:
    (1) drilling a hole in a base;
    (2) inserting a cartridge into the hole, said cartridge comprising:
        (a) a casing having a fluidtight construction;
        (b) partitioning means disposed in said casing for forming a first and a second chamber which are fluidtight relative to each other;
        (c) a resin being contained in said first chamber, said resin being substantially composed of an ester of an epoxy resin with an organic acid selected from the group consisting of acrylic acid, methacrylic acid and a mixture thereof and a reactive monomer; and
        (d) a curing agent for said resin component contained in said second chamber, said curing agent comprising an organic peroxide; and
    (3) driving an anchor bolt into the hole so that said casing and said partitioning means of said cartridge are broken by the anchor bolt which allows said resin and said curing agent to be homogeneously mixed and to fill in spaces between the inner wall of the hole and the periphery of the bolt, which enables the anchor bolt to be fixed to the base in a short period of time, with a strong adhesive connection between the anchor bolt and the base, said strong adhesive connection having a high resistance to chemicals and water.

20. The method according to claim 19, wherein the width of the cartridge is 1 to 5 mm larger than the outer diameter of the anchor bolt.

21. The method according to claim 19, wherein the ratio of the length of the cartridge to the depth of the hole is 0.7 to 1.0.

22. The method according to claim 19, wherein the forward end of the anchor bolt is cut diagonally with respect to the axis of the anchor bolt.

23. A curable composition, comprising:
    a resin being substantially composed of an ester of an epoxy resin with an organic acid selected from the group consisting of acrylic acid, methacrylic acid and a mixture thereof and a reactive monomer; and
    a curing agent for said resin component comprising an organic peroxide.

* * * * *